L. J. FLINT.
METHOD OF FORMING GRIP NUTS.
APPLICATION FILED JULY 20, 1914.

1,174,247.

Patented Mar. 7, 1916.

Witnesses:
Arthur W. Carlson
Robert F. Weir

Inventor:
Louis J. Flint
By ✦✦✦
Attys.

THE COLUMBIA PLANOGRAPH CO., WASHINGTON, D. C.

UNITED STATES PATENT OFFICE.

LOUIS J. FLINT, OF DETROIT, MICHIGAN, ASSIGNOR TO GRIP NUT COMPANY, OF CHICAGO, ILLINOIS, A CORPORATION OF ILLINOIS.

METHOD OF FORMING GRIP-NUTS.

1,174,247.  Specification of Letters Patent.  Patented Mar. 7, 1916.

Application filed July 20, 1914. Serial No. 851,964.

*To all whom it may concern:*

Be it known that I, LOUIS J. FLINT, a citizen of the United States of America, residing at Detroit, in the county of Wayne and State of Michigan, have invented a certain new and useful Method of Forming Grip-Nuts, of which the following is a description.

My invention belongs to that general class of bolt nuts adapted to fit upon the coöperating bolt in such a manner as to reduce the tendency of accidental disengagement from the bolt.

To this end my invention consists in the novel method of forming a grip nut, shown and described, and more particularly pointed out in the claims.

Figure 1:
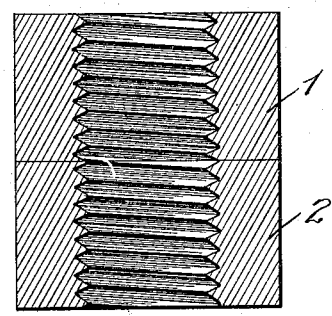
Figure 2:
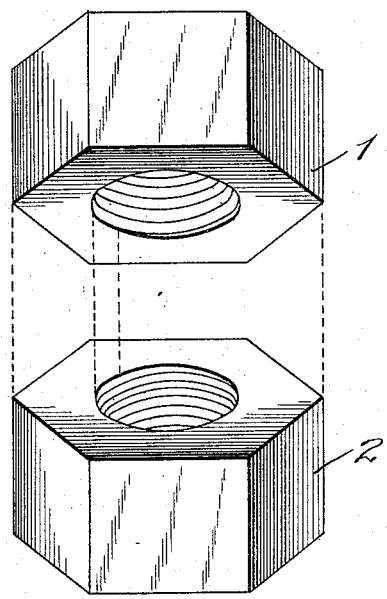

In the drawings, wherein like reference characters indicate like or corresponding parts, Figure 1 is a sectional view showing my improved grip nut completed and ready to apply to a bolt; Fig. 2 shows the two sections constituting the grip nut separated to illustrate the construction, and Fig. 3 is a fragmentary view showing one of the results of combining the sections in the manner set forth.

In the drawings it will be seen that the nut is composed of two independent sections, each of which is substantially a complete nut in itself, the two, after being separately formed, being brought together and suitably connected as by spot welding or otherwise to form an integral nut. In constructing the nut any preferred means may be employed to cause a varying fit of the two sections upon the bolt, that is one section may be standard cut or normal, while the other may vary therefrom and be slightly abnormal, causing it to bind upon the bolt to grip the same and preventing accidental disengagement by reason of said gripping effect. Or the two nuts may be made substantially the same, both being standard cut but so arranged as they are brought together that while they register externally the lead of the thread in one will be slightly in advance of the lead of the thread in the other, as indicated in Fig. 3.

As shown in the drawings, we may assume that the section marked 1 in Figs. 1 and 2 is a standard cut nut which will engage the bolt with a finger fit, while 2 is a substantially similar nut or section independently formed and attached to the first in such manner that the sides and bolt opening will coincide or register, and in which the lead of the thread in one section terminates in such proximity to the beginning of the lead in the other that in placing the nut upon the bolt the part 2 will engage the thread of the bolt, but in such manner as to bind or grip thereon, the sections being so cut, and in coöperation with section 1, as to bring about this result when properly assembled. To accomplish this there may be a slight offset in the lead so that the thread of the second section of the nut will impinge or otherwise bind upon the bolt thread, or the thread of the second nut may be cut at a slightly different pitch or inclination, or at a slightly different spiral inclination, or at a lesser depth to bring about such result. In other words, the binding section of the nut may be cut or arranged in any manner in relation to the coöperating section as to bring about or secure the binding effect, while the first section of the nut may be normal or standard cut to secure easy engagement and holding power. It is obvious that this result may be secured as stated and that the second or binding section may be of a less thickness than the holding section, that is, that it is provided with a lesser number of threads to engage the bolt.

Figure 3:
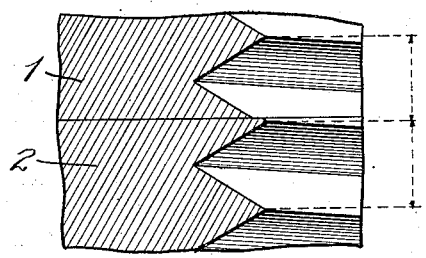

In Fig. 3 the fragmentary section shows the variation between the two sections of the nut in one form, exaggerated for the purpose of illustration, 1 indicating that portion of the nut which is designed to engage with the bolt in the normal manner, that is the usual holding nut, and 2 the following portion, whose function is to cause the nut to bind upon the bolt.

It is obvious that this completed and integral nut may be readily engaged with the bolt, and with a suitable wrench firmly seated, and by similar means may be disengaged without injuring the bolt or nut, so that the two may be readily employed again when desired.

It is also obvious that the thickness of the nut sections may be varied as desired without departing from the spirit of my invention, and hence where, in the claims, I mention nut sections as substantially the same size, the thickness of the sections is not necessarily included.

What I claim as new and desire to secure by Letters Patent is:

1. The herein described method of forming a grip nut, consisting in taking two independent bolt nut sections, separately formed with substantially coincident bolt holes, and arranging and securing them together so that one section will readily thread upon the bolt, while the following section will bind thereon to grip the same and prevent accidental disengagement therefrom.

2. The herein described method of forming a grip nut, consisting in forming two independent nut sections adapted to be engaged with a bolt and securing the two together to form a substantially integral nut, the two sections being so arranged that when mounted on a bolt there will be a slight variation in the engagement of the threads of the two sections with the bolt, serving to bind the nut to the bolt and prevent accidental disengagement therefrom.

3. The herein described method of forming a grip nut, consisting in forming two independent nut sections with substantially coincident outer walls and bolt holes, in which the thread is cut substantially the same in each, but with the lead of the thread in one slightly advanced over the lead of the thread in the other, and securing the two together; forming an integral nut whereby the nut will readily engage a bolt until the second section is reached, after which there will be a binding or locking effect of the nut with the bolt.

In testimony whereof, I have hereunto signed my name in the presence of two subscribing witnesses.

LOUIS J. FLINT.

Witnesses:
E. BOWEN,
L. E. APPLETON.

Copies of this patent may be obtained for five cents each, by addressing the "Commissioner of Patents, Washington, D. C."